(12) United States Patent
Kim et al.

(10) Patent No.: US 8,944,043 B2
(45) Date of Patent: Feb. 3, 2015

(54) HEATING COOKER OPERABLE TO DEODORIZE/DESMOKE

(75) Inventors: Jong Boo Kim, Daegu (KR); Ki Tack Chae, Busan (KR)

(73) Assignee: NUC Electronics Co., Ltd., Daegu (KR)

( * ) Notice: Subject to any disclaimer, the term of this patent is extended or adjusted under 35 U.S.C. 154(b) by 510 days.

(21) Appl. No.: 12/675,964

(22) PCT Filed: Mar. 23, 2009

(86) PCT No.: PCT/KR2009/001477
§ 371 (c)(1),
(2), (4) Date: Mar. 1, 2010

(87) PCT Pub. No.: WO2010/090369
PCT Pub. Date: Aug. 12, 2010

(65) Prior Publication Data
US 2011/0155117 A1 Jun. 30, 2011

(30) Foreign Application Priority Data

Feb. 7, 2009 (KR) .................. 10-2009-0009991

(51) Int. Cl.
*A21B 1/00* (2006.01)
*A47J 37/06* (2006.01)
(52) U.S. Cl.
CPC .............. *A47J 36/68* (2013.01); *A47J 37/0688* (2013.01)
USPC ................ 126/21 A; 96/283; 96/284; 96/309
(58) Field of Classification Search
CPC ...... B01D 47/06; B01D 47/02; B01D 47/025; B01D 47/027
USPC ........ 126/273, 275, 21 A, 299 R, 300, 299 D, 126/299 E, 299 F; 219/391; 55/283; 96/282–284, 309–311, 288; 454/54, 55
See application file for complete search history.

(56) References Cited

U.S. PATENT DOCUMENTS 2,321,653 A * 6/1943 Carlson ........................... 96/350
2,527,015 A * 10/1950 Lhota .............................. 261/91
(Continued)

FOREIGN PATENT DOCUMENTS

JP 05-007802 A 1/1993
JP 2001-029240 A 2/2001
(Continued)

*Primary Examiner* — Kenneth Rinehart
*Assistant Examiner* — Jason Lau
(74) *Attorney, Agent, or Firm* — Seed IP Law Group PLLC

(57) ABSTRACT

Disclosed is a heating cooker suitable for cooking fish, meat, or the like, and preventing smell or smoke from being released when the cooking chamber is opened. The disclosed heating cooker comprises an enclosed cooking chamber having at least one heating element contained in the enclosed cooking chamber and a ventilation chamber having an inlet passage and an outlet passage. The cooking chamber is connected to the cooking chamber via the inlet and outlet passages allowing air to circulate between the ventilation chamber and the cooking chamber. A fan and a spraying unit may be disposed in the ventilation chamber wherein the fan is operable to circulate air between the cooking chamber and the ventilation chamber, and the spraying unit is operable to spray water from a reservoir adjacent to the ventilation chamber to intercept smell or smoke contained in air in the ventilation chamber.

16 Claims, 10 Drawing Sheets

(56) References Cited

U.S. PATENT DOCUMENTS

| | | | |
|---|---|---|---|
| 3,149,935 A * | 9/1964 | Jamison et al. | 95/218 |
| 4,388,086 A * | 6/1983 | Bauer et al. | 95/118 |
| 6,241,809 B1 * | 6/2001 | Hopkins | 95/216 |
| 2001/0027355 A1 * | 10/2001 | Lee et al. | 700/211 |
| 2004/0079355 A1 * | 4/2004 | Divett et al. | 126/21 R |
| 2006/0096461 A1 * | 5/2006 | Kim et al. | 96/283 |
| 2006/0230713 A1 * | 10/2006 | Kim | 55/283 |

FOREIGN PATENT DOCUMENTS

| | | |
|---|---|---|
| JP | 2006-068690 A | 3/2006 |
| KR | 20-0406269 Y1 | 1/2006 |
| WO | WO 2006062283 A1 * | 6/2006 |

* cited by examiner (a)

(b)

PRIOR ART

HEATING COOKER OPERABLE TO DEODORIZE/DESMOKE

BACKGROUND

1. Technical Field

The present invention relates to a heating cooker having a closed cooking chamber, and more particularly, to a heating cooker suitable for cooking fish, meat, or the like, which causes plenty of smell and smoke, and preventing smell or smoke from being emitted when the closed cooking chamber is open or during cooking.

2. Description of the Related Art

Heating cookers with enclosed cooking chambers may be classified as roasters, grills, bakers, electric ovens, and so on. Such heating cookers generate plenty of smoke and smell while heating and cooking food. For example, if an enclosed cooking chamber is opened after cooking is completed, smell and smoke generated in the enclosed cooking chamber are immediately released, which may be inconvenient for the user. In particular, such inconvenience is more serious when the food is fish or meat.

FIG. 10 is a perspective view of a conventional heating cooker suitable for cooking fish or meat. The conventional heating cooker of FIG. 10 includes a container 3 and a lid 4 which are connected to each other by a hinge 2. When an upper portion of the container 3 is covered with the lid 4, an enclosed cooking chamber is defined therebetween. A lower heater 5a and an upper heater 5b are respectively installed in lower and upper portions of the cooking chamber, i.e., the container 3 and the lid 4. Also, the container 3 is provided with a grill 9 or the like for supporting food. In addition, a deodorizing filter 6 is installed in the lid 4, wherein the deodorizing filter 6 includes a substance for absorbing and eliminating gas or vapor containing smell or smoke, deodorant, or catalyst.

However, due to a limited capability of the deodorizing filter, the conventional heating cooker is insufficient for eliminating the smoke or smell components which are increasingly generated with longer cooking times. In addition, since gas or vapor having smell or smoke generated during cooking is condensed in the deodorizing filter within a short time, the capability of the deodorizing filter exceeds its limit quickly. Also, the deodorizing filter cannot deodorize/adsorb smell or smoke generated after its limit is exceeded.

A heating cooker may have a cooking chamber filled with water at the bottom to a certain depth in order to help absorb smoke and smell. In this case, oil and heated vapor generated while cooking fish or meat may partially contact the water due to internal convection and then dissolve therein, which may decrease smell to some extent. However, most of the smell or smoke generated during cooking has a high temperature and thus collects in an upper portion of the cooking chamber rather than its lower portion. Therefore, a very small amount of the smell or smoke is absorbed and dissolved in the water and most of the smell or smoke is discharged to the air.

Forcing the gas containing smell or smoke generated during cooking into the water is also not effective in that the deodorizing efficiency is poor and noise is also generated. Additionally, heat is discharged together with the discharged gas containing smell or smoke, which may cause energy loss.

BRIEF SUMMARY

According to an example embodiment, a heating cooker is provided that has a ventilation chamber connected to an enclosed cooking chamber to ensure air circulation therebetween. Smell and smoke in the air introduced into the ventilation chamber from the cooking chamber is intercepted by a water curtain formed by sprayed water.

The heating cooker may comprise a closed cooking chamber having a heating element for heating food contained in closed cooking chamber and a ventilation chamber having an inlet passage and an outlet passage. The ventilation chamber is connected to the cooking chamber via the inlet and outlet passages so that air circulates between the ventilation chamber and the cooking chamber. The heating cooker may have a fan for circulating air between the cooking chamber and the ventilation chamber, a reservoir disposed adjacent to the ventilation chamber, and a spraying unit for spraying water in the reservoir into the ventilation chamber. The water sprayed by the spraying unit forms a water curtain successively in the middle of the ventilation chamber substantially preventing smell or smoke in the air from passing through the water curtain. The reservoir may be disposed adjacent to a lower portion of the ventilation chamber so that the sprayed water is retrieved. The reservoir may be detachably coupled to the lower portion of the ventilation chamber.

According to an example embodiment, the spraying unit may be a rotatable spraying body for spraying water radially by centrifugal force. The rotatable spraying body includes a sending passage partially dipped into the water of the reservoir and a plurality of spray holes formed in a sidewall of the spraying body through which water from the sending passage may pass.

The fan may be positioned at an upper side of the rotatable spraying body between the inlet and outlet passages of the ventilation chamber. The fan and the rotatable spraying body may be connected to a common motor to rotate the fan and the spraying body.

According to one example embodiment, the ventilation chamber may be comprised of an inner tank that surrounds the fan and the rotatable spraying body, and an outer tank surrounding the inner tank. An inlet chamber and an outlet chamber may be defined by a barrier connected to and formed outside the inner tank, wherein the barrier is disposed between the inner tank and outer tank.

The inlet passage may be defined by the inlet chamber, an outer inlet of the outer tank and an inner inlet of the inner tank, which are connected to the inlet chamber. The outlet passage may be defined by the outlet chamber, an outer outlet of the outer tank and an inner outlet of the inner tank, which are connected to the outlet chamber. The inner inlet may be a cutout formed at a lower end of the inner tank, and the inner outlet may be a cutout formed at an upper end of the inner tank.

The rotatable spraying body may include a plurality of disks which are adjacent to the spray holes and protrude radially from the sidewall. Further, the rotatable spraying body may be a structure of increasing diameter from a lower side to an upper side of the spraying body. In addition, the sending passage may be configured to have an inner diameter that increases from a lower portion that is dipped in the water of the reservoir to an upper side of the sending passage.

According to one example embodiment, the heating cooker may further comprise a controller for receiving a signal from an input unit to control the heating unit, the fan and the spraying unit. The controller may receive a signal from the input unit to cooperatively control the heating element, the fan and the spraying unit in such a manner that the controller operates the heating element at an initial stage, then operates the heating element, the fan and the spraying unit together, and after stopping the heating element, continues operating the fan and the spraying unit.

The heating cooker may further comprise a moisture removing filter for filtering off moisture contained in the air moving from the ventilation chamber to the cooking chamber. The reservoir may be detachably coupled to a lower portion of the ventilation chamber and the filter may be supported on a wall of the reservoir and disposed in the outlet passage of the ventilation chamber. The moisture removing filter may be detachably installed to the wall of the reservoir.

A plurality of ribs may be formed in a lower portion of the sending passage, the ribs being shaped to guide water to an upper portion of the sending passage during rotation of the rotatable spraying body.

According to embodiments of the present invention, a ventilating chamber is further provided to be connected to a closed cooking chamber to ensure air circulation therebetween, and smell or smoke contained in the air introduced into the ventilating chamber is intercepted and absorbed by droplets in the form of a water curtain made by radially sprayed water. Thus, there is an effect in that smell or smoke generated during cooking is eliminated in the ventilating chamber without discharging the smell or smoke to the outside.

DETAILED DESCRIPTION

Figure 1:
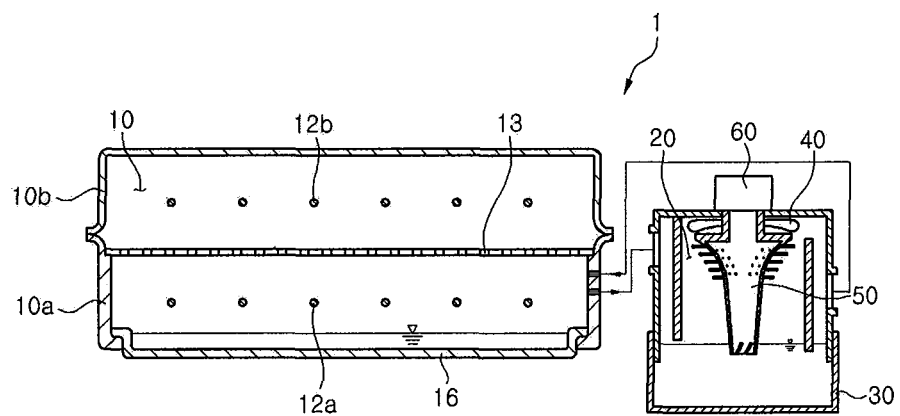
FIG. 1 is a side cross-sectional view of a heating cooker according to an example embodiment of the present invention.

Hereinafter, embodiments of the present invention will be described in detail with reference to the accompanying drawings. The following embodiments are provided only for illustrative purposes so that those skilled in the art can fully understand the spirit of the present invention. Therefore, the present invention is not limited to the following embodiments but may be implemented in other forms. In the drawings, the widths, lengths, thicknesses and the like of elements may be exaggerated for convenience of illustration. Like reference numerals indicate like elements throughout the specification and drawings.

Figure 2:
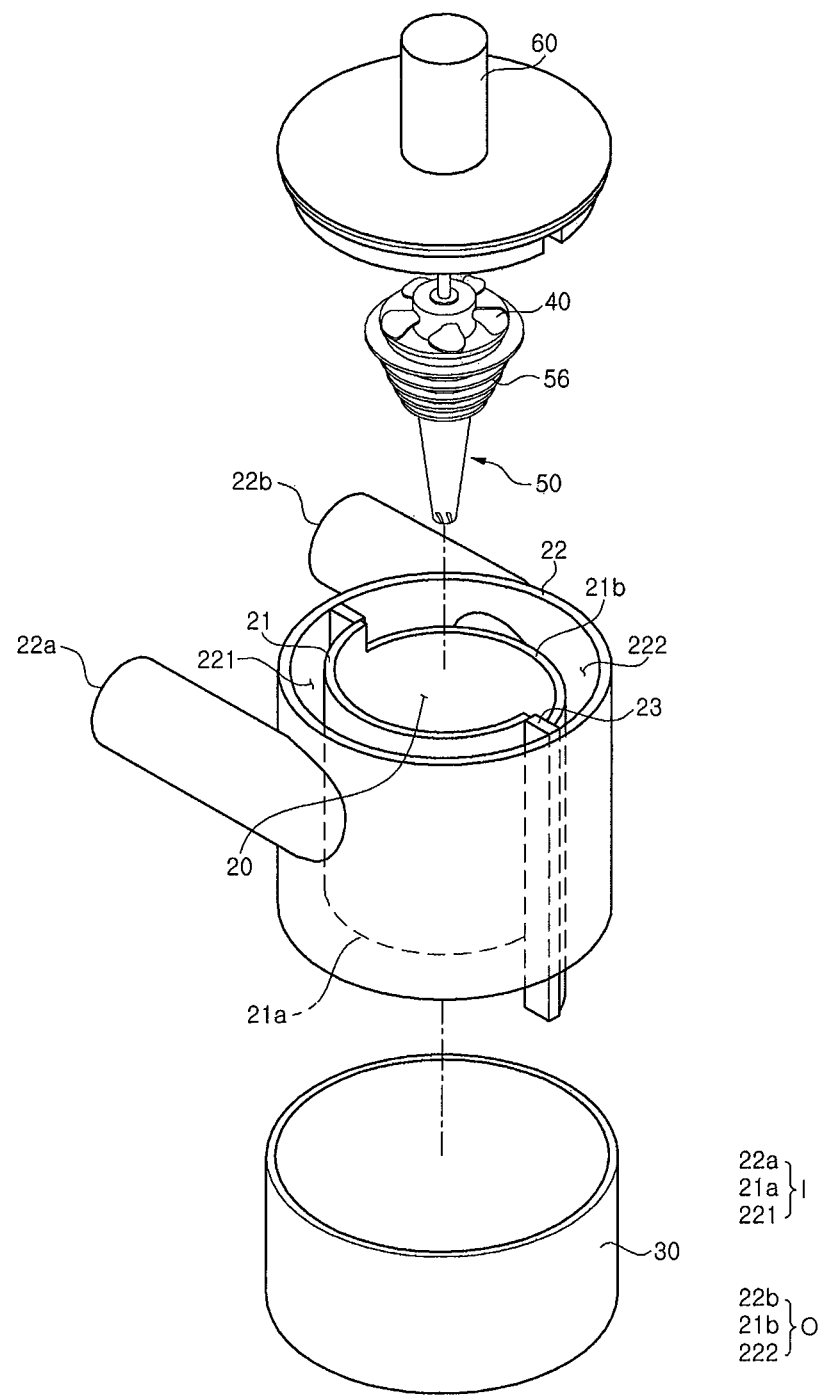
FIG. 2 is an exploded perspective view showing components of a ventilation chamber of the heating cooker according to an example embodiment of the present invention.
Figure 3:
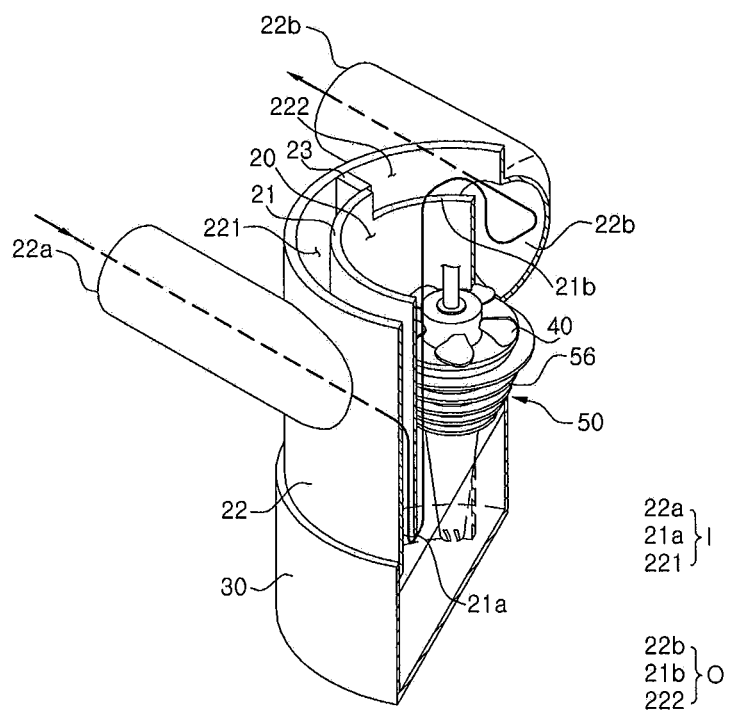
FIG. 3 is a partial cutaway perspective view of the ventilation chamber of FIG. 2.
Figure 4:
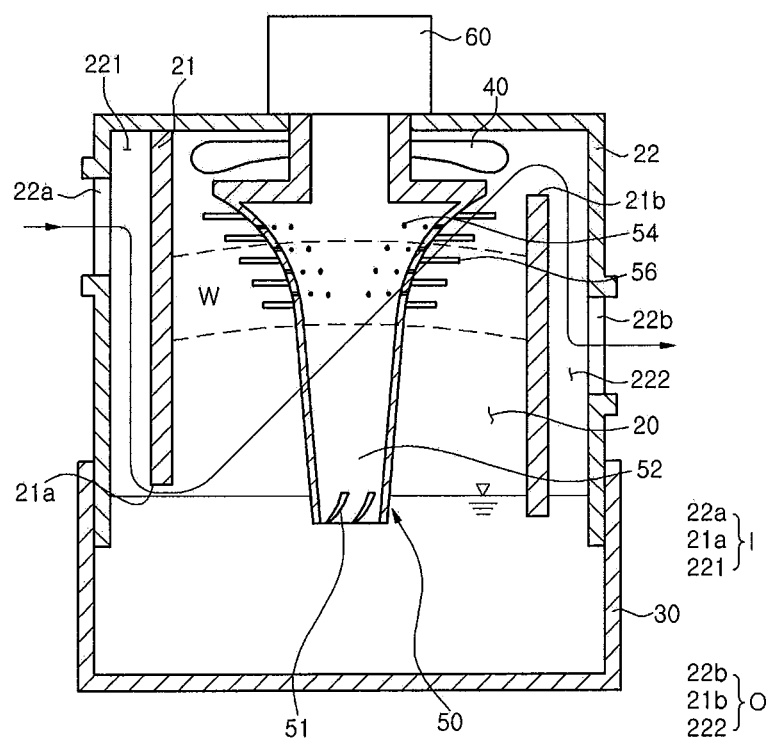
FIG. 4 is a side cross-sectional view of the ventilation chamber of FIG. 2 illustrating the operation of a fan and a spraying unit of the ventilation chamber of the heating cooker according to an embodiment of the present invention.

FIG. 1 is a side cross-sectional view of a heating cooker according to an example embodiment of the present invention, FIG. 2 is an exploded perspective view showing components of a ventilation chamber of the heating cooker according to an example embodiment of the present invention, and FIG. 3 is a partial cutaway perspective view of the ventilation chamber of FIG. 2. Also, FIG. 4 is a side cross-sectional view of the ventilation chamber of FIG. 2 illustrating the operation of a fan and a spraying unit of the ventilation chamber of the heating cooker according to an embodiment of the present invention.

As shown in FIG. 1, a heating cooker 1 of the example embodiment includes an enclosed cooking chamber 10, in which food such as fish or meat is heated and cooked. In this embodiment, the cooking chamber 10 has a space defined between a container 10a and a lid 10b when the container 10a with an open upper end is covered with the lid 10b. However, the present invention is not limited thereto and the cooking chamber may have any configuration wherein food may be put into the closed cooking chamber 10 and then removed from the cooking chamber 10.

In a configuration where the cooking chamber 10 is defined by the container 10a and the lid 10b, an inflow channel and an outflow channel for connecting the cooking chamber 10 and a ventilation chamber 20 may be located together at the lid 10b, together at the container 10a, or at the container 10a and the lid 10b separately.

Within the cooking chamber 10, a lower heater 12a and an upper heater 12b for heating foods are installed to face each other. In this embodiment, the lower heater 12a is installed in the container 10a, and the upper heater 12b is installed in the lid 10b. A support 13 for supporting food, such as a grill, a cooking plate or a heating plate, may be disposed between the lower heater 12a and the upper heater 12b in such a manner that the support 13 is mounted on steps formed on the container 10a.

Also, a detachable water receiver 16 is installed at the bottom of the container 10a adjacent to a lower portion of the cooking chamber 10. Water in the water receiver 16 contacts with a portion of oil or heated vapor generated during cooking that moves downward by internal convection, thereby partially removing smell or smoke components. However, in cases where food should be cooked in a moisture controlled environment, it may be advantageous that the water receiver 16 is not included. Thus, a heating cooker from which the water receiver 16 is intentionally excluded may be another example embodiment of the present invention.

According to an embodiment, the heating cooker 1 further includes a ventilation chamber 20 connected to the cooking chamber 10, and has a fan 4 such that air may circulate therebetween. To this end, the ventilation chamber 20 and the cooking chamber 10 are connected to each other through an inlet passage I (see FIG. 5a) and an outlet passage O (see FIG. 5b). The air generated from the cooking chamber 10, i.e., the air containing smell and smoke, is introduced into the ventilation chamber 20 through the inlet passage I. Thereafter, the smell or smoke is removed from the air in the ventilation chamber 20, and then, the air free from smell and smoke comes out of the ventilation chamber 20 through the outlet passage O and enters the cooking chamber 10 again.

As shown in FIGS. 2 to 4, the heating cooker includes a reservoir 30 disposed adjacent to a lower portion of the ventilation chamber 20. Accordingly, the air in the ventilation chamber 20 interfaces with the water in the reservoir 30. The air in the ventilation chamber 20 is contaminated by smell or smoke generated in the cooking chamber 10. The present embodiment includes a spraying unit for pulling water from the reservoir 30 and then radially spraying the ventilation chamber 20 with the water in the form of droplets. The radially sprayed droplets form a water curtain W in the middle of the ventilation chamber 20 as shown by a dashed line block in FIG. 4. The water curtain W intercepts smell or smoke in the air in the middle of the ventilation chamber 20. The intercepted smell or smoke components are absorbed in the droplets and then fall into the reservoir 30. The reservoir 30 is detachably installed, so that it is easy to exchange water in the reservoir 30 and/or clean the interior of the reservoir 30.

Hereinafter, the configuration and operation of the major components in the ventilation chamber 20 of the heating cooker according to an embodiment of the present invention will be described in more detail.

As shown in FIGS. 3 and 4, the spraying unit according to an embodiment of the present invention comprises a rotatable spraying body 50 that operates by centrifugal force. According to one embodiment, the rotatable spraying body 50 is configured to spray droplets (or, water particles) by centrifugal force while rotating. However, the spraying unit having other structures or spraying methods may also be included in alternative embodiments of the present invention.

The rotatable spraying body 50 includes a sending passage 52 (see FIG. 4) extending in the center thereof, and a plurality of spray holes 54 (see FIG. 4) formed in a sidewall thereof to be connected with the sending passage 52. A lower portion of the sending passage 52 is dipped into the water of the reservoir 30. Here, a plurality of ribs 51 are formed in the lower portion of the sending passage 52. The rotatable spraying body 50 is rotated by a motor 60 (see FIGS. 2 and 4). Due to the rotation and its centrifugal force, the water in the reservoir 30 is forcibly carried upward through the sending passage 52, and the forcibly carried water is sprayed to the outside through the spray holes 54 by the centrifugal force. The plurality of ribs 51 are formed to slantingly protrude from the lower end of the sending passage 52 to a certain height. Also, the plurality of ribs 51 are shaped to guide water from the lower end of the sending passage to an upper side thereof while the rotatable spraying body 50 rotates, thereby causing the water to be more easily pulled up through the sending passage 52. In addition, the sending passage 52 may be configured such that its inner diameter increases from the lower portion dipped in the water of the reservoir 30 to the upper side.

Also, the rotatable spraying body 50 is integrally provided with a plurality of disks 56 which are adjacent to the spray holes 54 and radially protrude from the sidewall. At least one spray hole 54 is formed between adjacent disks. The plurality of disks 56 helps the sprayed water droplets to scatter more widely and fall. Also, the rotatable spraying body 50 may be a structure of increasing diameter from a lower side to an upper side of the spraying body. Accordingly, the plurality of disks 56 may be arranged such that an upper disk has a diameter greater than a lower one.

In this embodiment, the rotatable spraying body 50 and the fan 40 are connected to a single motor 60 to make concentric rotation. Accordingly, by operating only one motor 60, the fan 40 and the rotatable spraying body 50 are rotated at the same time, thereby circulating air between the cooking chamber 10 (see FIG. 2) and the ventilation chamber 20 and also eliminating smell and smoke in the ventilation chamber 20. The fan 40 may be positioned above the rotatable spraying body 50 and located between the inlet passage I and the outlet passage O of the ventilation chamber 20. Differently from the figures, the fan 40 and the rotatable spraying body 50 may be respectively connected to and rotated by different motors.

The ventilation chamber 20 may be comprised of an inner tank 21 that surrounds the fan 40 and the rotatable spraying body 50, and an outer tank 22 surrounding the inner tank 21. An inlet chamber 221 and an outlet chamber 222 may be defined by a barrier 23 (see FIGS. 2, 3 and 5) connected to and formed outside the inner tank 21, and disposed between the inner tank 21 and outer tank 22.

As shown in FIGS. 2, 3, 4 and 5 (*a*), the inlet passage I of the ventilation chamber is defined by the inlet chamber 221 and an outer inlet 22*a* of the outer tank 22 and an inner inlet 21*a* of the inner tank 21 which are connected to the inlet chamber. Also, as shown in FIGS. 2, 3, 4 and 5 (*b*), the outlet passage O of the ventilation chamber is defined by the outlet chamber 222 and an outer outlet 22*b* of the outer tank 22 and an inner outlet 21*b* of the inner tank 21 which are connected to the outlet chamber. Here, the inner inlet 21*a* is formed by a cutout at a lower end of the inner tank 21, and the inner outlet 21*b* is formed by a cutout at an upper end of the inner tank 21.

Figure 5:
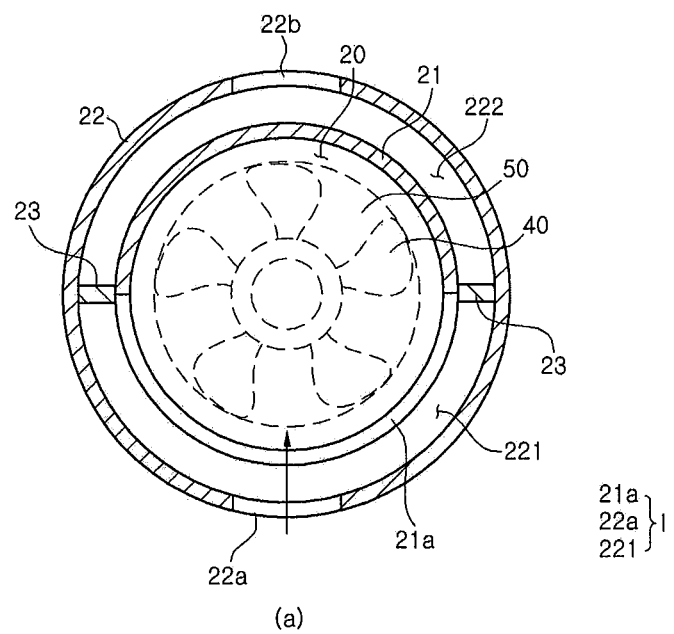
FIGS. 5 (a) and (b) are top cross-sectional views illustrating inlet and outlet passages of the ventilation chamber of FIG. 2.
Figure 5:
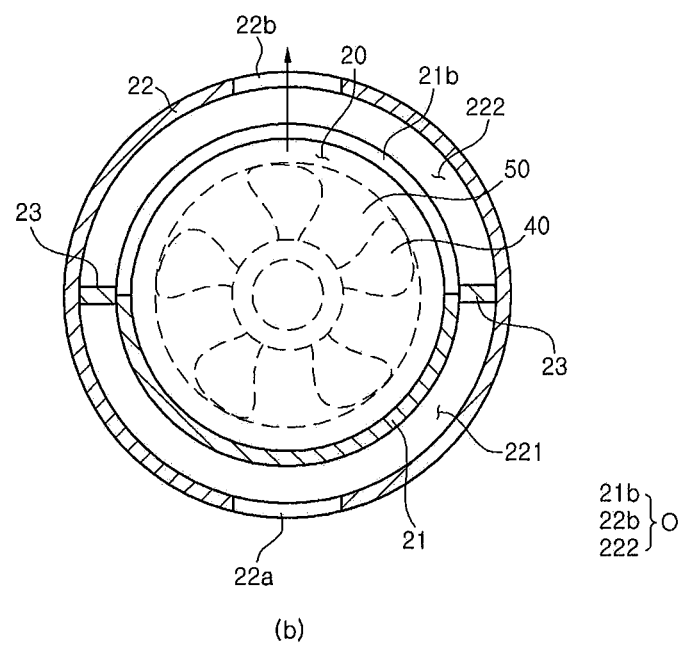

In FIGS. 3, 4 and 5, an air moving path in the ventilation chamber is represented by arrows. Referring to the figures, when the fan 40 is rotated by the motor 60, the contaminated air in the cooking chamber 10 (see FIG. 2) is introduced into the ventilation chamber 20 through the inlet passage I. At this time, the rotatable spraying body 50 is rotated together with the fan 40, and accordingly, the rotatable spraying body 50 pulls up the water from the reservoir 30 and sprays the water to the contaminated air in the ventilation chamber 20. The sprayed water absorbs smell and smoke in the air and then falls into the reservoir 30.

The air in the ventilation chamber 20 flows out to the cooking chamber 10 through the outlet passage O of the ventilation chamber by the successive rotation of the fan 40. The smell and smoke components removed from the air are dissolved or immersed in the water and then collected in the reservoir 30 adjacent to the lower portion of the ventilation chamber 20. The reservoir 30 may be detachably coupled to the lower portion of the ventilation chamber 20, and accordingly, the reservoir 30 may be separated from the lower portion of the ventilation chamber 20 for exchanging water. The detaching manner of the reservoir 30 may vary.

The air heated in the cooking chamber 10 of the heating cooker 1 may pass through the ventilation chamber 20 and then enters the cooking chamber 10 again without extensive heat loss. However, if the temperature of the water in the reservoir 30 increases excessively, the performance of the heating cooker may be negatively affected. In order to prevent such water temperature increase, a cooling device (not shown) for controlling the water temperature in the reservoir 30 below a certain level may be installed in the reservoir 30. The cooling device may be a thermoelectric element or a pipe through which a cooling material flows. The cooling device may prevent the performance of the heating cooker from being negatively affected by an excessive increase in water temperature in the reservoir 30.

Figure 6:
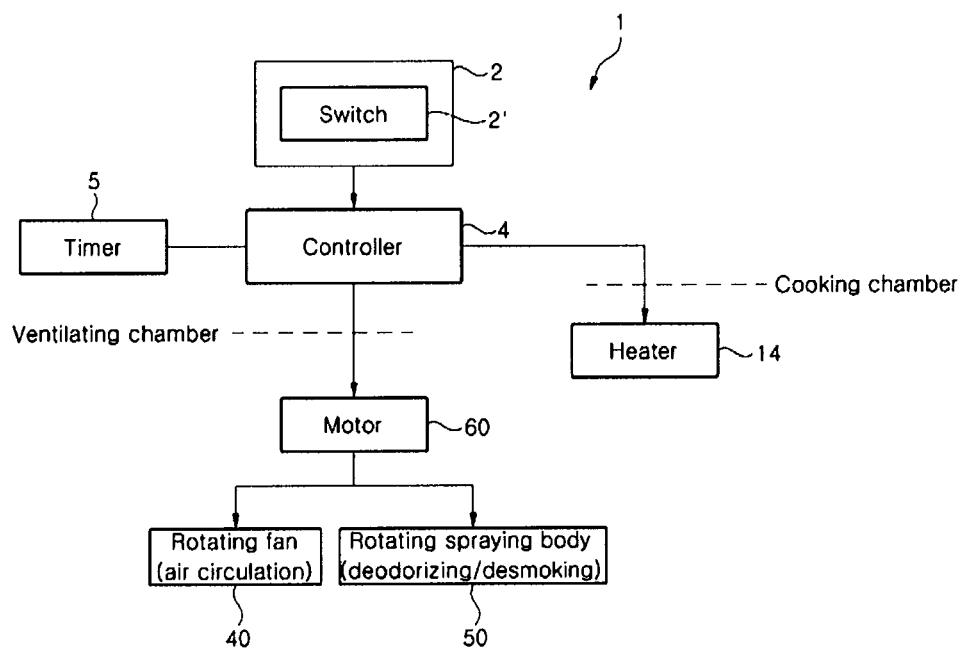
FIG. 6 is a block diagram illustrating a control logic of the heating cooker according to an example embodiment of the present invention.

FIG. 6 is a block diagram illustrating a control logic of the heating cooker according to one example embodiment of the present invention. Referring to FIG. 6, the heating cooker 1 includes an input unit 2 and a controller 4. The input unit 2 includes a switch 2' with a cooking/ventilating switching function to provide an input for cooperatively performing the cooking and ventilating operations. Although not shown, the input 2 may further include switches for performing other operations of the heating cooker, in addition to the switch 2'. Also, the controller 4 may be signal-connected to a timer 5 and may use time information obtained from the timer 5 to determine an operation or to stop timing of the fan 40 for ventilation.

For example, when a user creates an input using the switch 2' of the input unit 2, the controller 4 operates the heater 14 in the cooking chamber during an initial predetermined heating period, thereby increasing the temperature in the cooking chamber. The controller 4 receives information from the timer 5 and then, if the initial heating period elapses, the controller 4 operates the motor 60 to further drive the fan 40 and the rotatable spraying body 50 in a state where the heater 14 is in operation. Accordingly, smell and smoke generated during cooking is eliminated. Even when the heater 14 stops its operation, the controller 4 receives the time information from the timer 5 and may then further operates the motor 60 for a predetermined time. In this way, the fan 40 and the rotatable spraying body 50 operate to eliminate smell and smoke remaining after the cooking.

Figure 7:
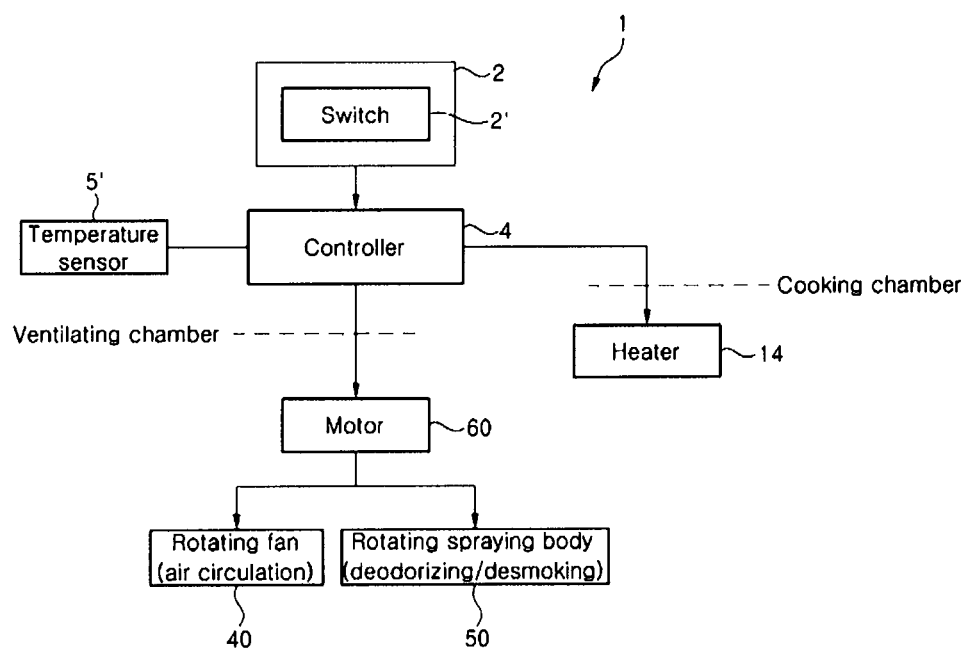
FIG. 7 is a block diagram illustrating a control logic of the heating cooker according to another example embodiment of the present invention.

Referring next to FIG. 7, shown is a block diagram illustrating a control logic of the heating cooker according to another example embodiment of the present invention. The control logic of this example is substantially similar to that of the previous example of FIG. 6. However, there is a difference in that the controller 4 uses a temperature sensor 5 instead of the timer employed in the previous example. The controller 4 is signal-connected to the temperature sensor 5 and may use the temperature information obtained from the temperature sensor 5 to determine an operation of or to stop the timing of the fan 40 for ventilation.

For example, when a user creates an input using the cooperation switch 2' in the input unit 2, the controller 4 operates the heater 14 in the cooking chamber to increase the temperature in the cooking chamber. The controller 4 may receive temperature information from the temperature sensor 5' and then, if the temperature in the cooking chamber exceeds a predetermined value, the controller 4 operates the motor 60 to drive the fan 40 and the rotatable spraying body 50 during a state in which the heater 14 operating. Accordingly, smell and smoke generated during cooking is eliminated. If the heater 14 stops its operation, the controller 4 may further operate the fan 40 and the rotatable spraying body 50 until the temperature in the cooking chamber decreases below a predetermined value, thereby further eliminating remaining smell and smoke. Alternatively, the temperature sensor of the present example may be adopted together with the timer of the previous example. In this case, the time information obtained from the timer and the temperature information in the cooking chamber obtained from the temperature sensor may be used together. For example, after the heater 14 is operated for initially increasing the temperature in the cooking chamber, the timing for operating the fan 40 and the rotatable spraying body 50 is determined using the temperature information obtained from the temperature sensor. However, after the heater 14 stops its operation, the length of time for operating the fan 40 and the rotatable spraying body 50 may be determined by means of the timer.

Figure 8:
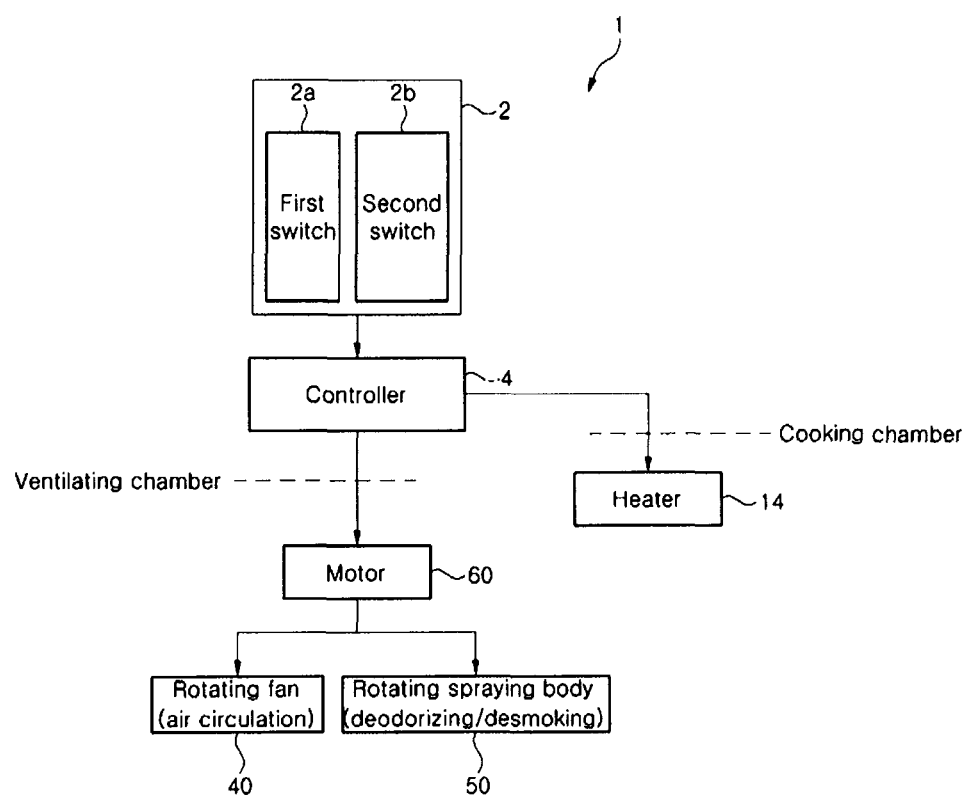
FIG. 8 is a block diagram illustrating a control logic of the heating cooker according to a further example embodiment of the present invention.

Referring next to FIG. 8, shown is a block diagram illustrating a control logic of the heating cooker according to a further example embodiment of the present invention. The heating cooker 1 may include an input unit 2 and a controller 4. The input unit 2 includes a first switch 2a for inputting an ON/OFF signal of the heater 14 that is a heating means in the cooking chamber, and a second switch 2b for operating the motor 60 that rotates the fan 40 and the rotatable spraying body 50 in the ventilation chamber together.

The controller 4 receives a signal from the first switch 2a to operate the heater 14, thereby heating food in the cooking chamber. Also, the controller 4 receives a signal from the second switch 2b to operate the motor 60, and the operation of the motor 60 cause the fan 40 and the rotatable spraying body 50 to rotate together. The fan 40 allows air to circulate between the cooking chamber and the ventilation chamber, and the rotating spraying unit 50 pulls the water from the reservoir 30 and sprays the water to the air introduced into the ventilation chamber. This example is different from the previous examples in that a switch for operating the heater for cooking and a switch for operating the rotating ventilation fan and/or the rotatable spraying body are provided independently.

Figure 9:
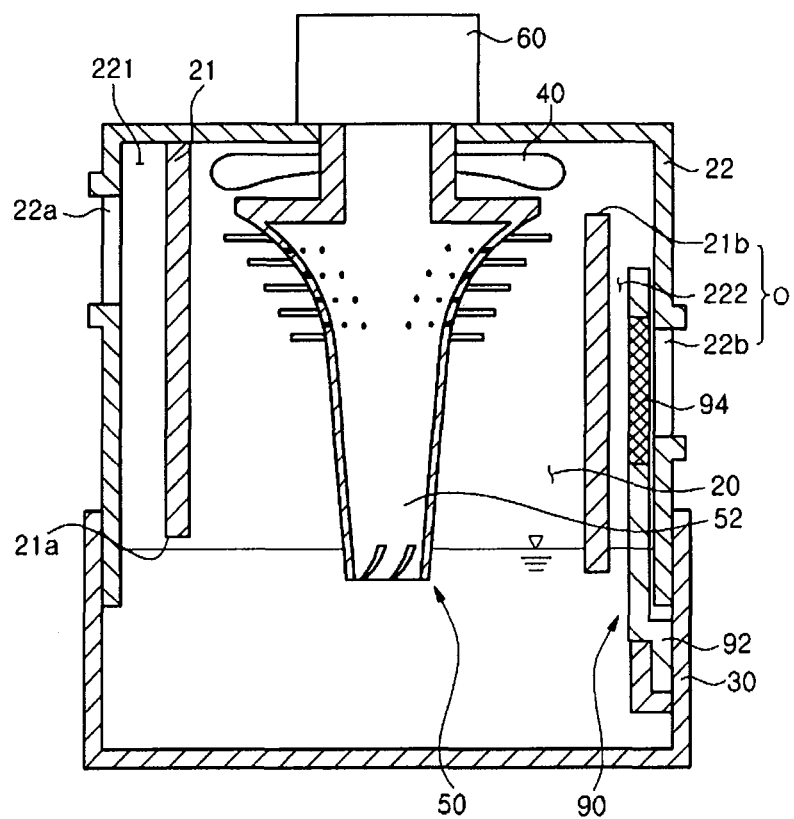
FIG. 9 is a side cross-sectional view of an example ventilation chamber illustrating a moisture removing filter provided in the ventilation chamber according to another embodiment of the present invention.
Figure 10:
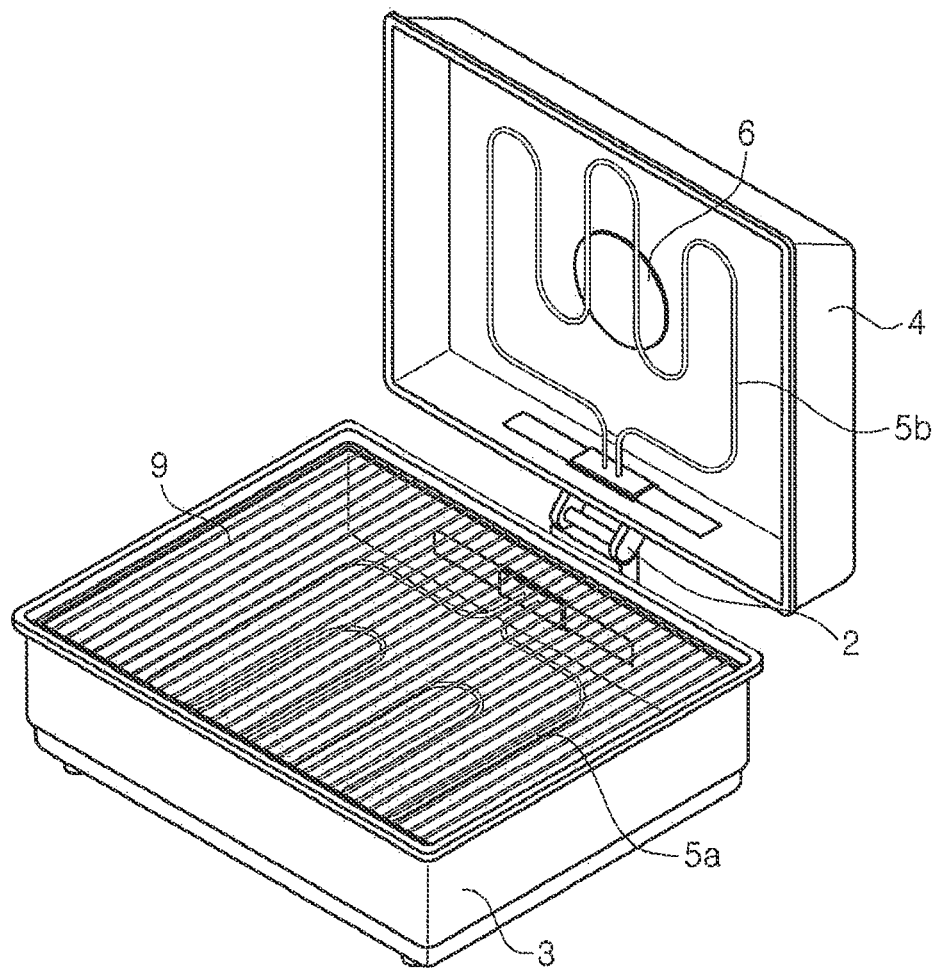
FIG. 10 is a perspective view of a conventional heating cooker.

Referring next to FIG. 9, shown is a side cross-sectional view of an example ventilation chamber 20 illustrating a moisture removing filter provided in the ventilation chamber 20 according to another embodiment of the present invention. A moisture removing filter 90 for separating and removing moisture from the air is disposed to close the outlet passage O of the ventilation chamber 20. More specifically, the moisture removing filter 90 includes a frame 92 detachably coupled to an inner wall of the reservoir 30 and thus supported by the inner wall of the reservoir 30, and a filtering unit 94 connected to the frame 92 and disposed to close the outlet passage O.

Accordingly, the reservoir 30 having the moisture removing filter 90 installed thereon is mounted to the lower portion of the ventilation chamber 20, and more specifically, to a lower portion of the outer tank 22, whereby the filtering unit 94 of the moisture removing filter 90 closes the outlet passage O, particularly the outer outlet 22b of the outer tank. Here, the filtering unit 94 may be a resin filter with micro pores, which is made, for example, of polypropylene, polyvinyl chloride, polyethylene, or similar hydrophobic material, or a metal net with micro pores. The moisture removing filter 90 allows air to pass therethrough but intercepts moisture in the air. The intercepted moisture may be formed into water drops and falls into the reservoir 30. Alternatively, the moisture removing filter 90 may be modified into different shapes allowing moisture to be formed into water drops, besides the net structure. Alternatively, a moisture removing filter containing a dehumidifying material such as zeolite may be considered.

The detachable structure of the aforementioned moisture removing filter 90 allows the moisture removing filter 90 to be selectively used. For example, when food in the cooking chamber needs more moisture for cooking, the moisture removing filter 90 may be excluded. However, if the food in the cooking chamber requires less moisture in cooking, the moisture removing filter 90 may be mounted.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A heating cooker, comprising:
    an enclosed cooking chamber having at least one heating element contained in the enclosed cooking chamber;
    a ventilation chamber having an inlet passage and an outlet passage, wherein the inlet passage and the outlet passage are connected to the cooking chamber and allow air to circulate from the cooking chamber to the ventilation chamber via the inlet passage and from the ventilation chamber back to the cooking chamber via the outlet passage, the inlet passage being in a first sidewall and the outlet passage being in a second sidewall that is spaced apart from and substantially parallel to the first sidewall, the first and second sidewalls extending in substantially vertical planes, and the outlet passage being positioned lower than the inlet passage;
    a fan disposed in the ventilation chamber for circulating air from the cooking chamber to the ventilation chamber and back to the cooking chamber, the fan being positioned between the inlet passage and the outlet passage to cause air to enter through the first sidewall and exit through the second sidewall that is substantially parallel to the first sidewall;
    a reservoir disposed adjacent to a lower portion of the ventilation chamber; and
    a spraying unit disposed in the ventilation chamber operable to spray water from the reservoir into the ventilation chamber to remove smell or smoke particles contained in air in the ventilation chamber, wherein the spraying unit is a rotatable spraying body operable to spray water radially by centrifugal force and wherein the rotatable spraying body has a sending passage partially dipped into an area of the reservoir for holding water and a plurality of spray holes formed in a sidewall of the spraying body through which water from the sending passage may pass, wherein the ventilation chamber comprises:
        an inner tank surrounding the fan and the spraying unit;
        an outer tank surrounding the inner tank; and
        one or more barriers disposed between the inner tank and outer tank defining an inlet chamber and an outlet chamber, the barriers being connected to and formed outside the inner tank, wherein the inlet chamber, an outer inlet of the outer tank, and an inner inlet of the inner tank define the inlet passage, and wherein the outlet chamber, an outer outlet of the outer tank, and an inner outlet of the inner tank define the outlet passage, the inner inlet of the inner tank disposed adjacent to the water in the reservoir.

2. The heating cooker of claim 1 wherein the fan and the spraying unit are connected to a common motor to cause the fan and spraying unit to rotate.

3. The heating cooker of claim 1 wherein the inner inlet is a cutout formed at a lower end of the inner tank, and the inner outlet is a cutout formed at an upper end of the inner tank.

4. The heating cooker of claim 1 wherein the spraying unit has a plurality of disks which are adjacent to the spray holes and protrude radially from the sidewall of the spraying unit.

5. The heating cooker of claim 1 wherein the spraying unit is a structure of increasing diameter from a lower side to an upper side of the spraying unit.

6. The heating cooker of claim 1 wherein a sending passage of the spraying unit has an inner diameter that increases from a lower portion of the sending passage to an upper side of the sending passage.

7. The heating cooker of claim 1 further including: a plurality of ribs are formed in a lower portion of a sending passage of the spraying unit, the ribs being shaped in a manner to guide water to an upper portion of the sending passage during rotation of the spraying unit.

8. The heating cooker of claim 1 wherein the fan and the spraying unit are connected to and rotated by different motors.

9. The heating cooker of claim 1 wherein the at least one heating element comprises an upper heater and a lower heater arranged to face each other.

10. The heating cooker of claim 1, further comprising a controller operable to receive a signal from an input unit to control the heating unit, the fan and the spraying unit.

11. The heating cooker of claim 10 wherein the controller is operable to receive a signal from the input unit to cooperatively control the heating element, the fan and the spraying unit in such a manner that the controller operates the heating element at an initial stage, then operates the heating element, the fan and the spraying unit together, and after stopping the heating element, continues to operate the fan and the spraying unit.

12. The heating cooker of claim 1, further comprising a moisture removing filter coupled to the heating cooker operable to filter off moisture contained in air circulating from the cooking chamber to the ventilation chamber and back to the cooking chamber.

13. The heating cooker of claim 12 wherein the reservoir is detachably coupled adjacent to a lower portion of the ventilation chamber, and the moisture removing filter is supported on a wall of the reservoir and disposed in the outlet passage.

14. The heating cooker of claim 13 wherein the moisture removing filter is detachably installed to the wall of the reservoir.

15. The heating cooker of claim 1, wherein the one or more barriers cause the circulating air to follow an air moving path between the first and second substantially parallel sidewalls.

16. The heating cooker of claim 15, wherein the air moving path bends around a bottom of a first barrier, continues diagonally through droplets of a water curtain formed by the radially sprayed water, and bends around a top of a second barrier.

* * * * *